United States Patent
Fairbanks

[19]

[11] Patent Number: 6,106,646
[45] Date of Patent: Aug. 22, 2000

[54] METHOD FOR JOINING COMPOSITE MATERIALS

[75] Inventor: Robert Paul Fairbanks, Cincinnati, Ohio

[73] Assignee: General Electric Company, Cincinnati, Ohio

[21] Appl. No.: 08/265,971

[22] Filed: Jun. 27, 1994

Related U.S. Application Data

[63] Continuation of application No. 08/092,375, Jul. 15, 1993, abandoned, which is a continuation of application No. 07/944,580, Sep. 14, 1992, abandoned.

[51] Int. Cl.⁷ .............................. B32B 31/18; B32B 31/26
[52] U.S. Cl. .......................... 156/73.3; 156/93; 156/253; 156/286; 156/293
[58] Field of Search .............................. 83/30, 660, 956; 156/73.1, 73.3, 91, 93, 253, 286, 293

[56] References Cited

U.S. PATENT DOCUMENTS

| | | | |
|---|---|---|---|
| 2,329,681 | 9/1943 | Zeier | 112/213 |
| 3,296,990 | 1/1967 | Simjian | 112/262 |
| 3,817,802 | 6/1974 | Meyer | 156/73 |
| 3,837,985 | 9/1974 | Chase | 156/253 X |
| 4,160,055 | 7/1979 | Reed | 156/73.3 X |
| 4,299,871 | 11/1981 | Forsch | 156/93 X |
| 4,331,495 | 5/1982 | Lackman et al. | 156/93 |
| 4,331,723 | 5/1982 | Hamm | 156/93 X |
| 4,541,349 | 9/1985 | Inoue | 112/221 |
| 4,671,149 | 6/1987 | Makabe et al. | 83/956 X |
| 4,696,711 | 9/1987 | Greszczuk | 156/285 X |
| 4,971,641 | 11/1990 | Nelson et al. | 156/91 X |
| 5,186,776 | 2/1993 | Boyce et al. | 156/73.1 X |
| 5,268,055 | 12/1993 | Bales et al. | 156/253 X |

FOREIGN PATENT DOCUMENTS

| | | | |
|---|---|---|---|
| 0033112 | 2/1984 | Japan | 156/93 |
| 3-222724 | 10/1991 | Japan | |
| 1115170 | 5/1968 | United Kingdom | |

OTHER PUBLICATIONS

1. Data Sheet from Technology Marketing Inc. This data sheet provides information for a portable instrument which uses uiltrasonics to cut, trim and weld prepreg materials.
2. Naval Weapons Center Report—NAV–0024–FM–8696–103 (Relevant Part) p. 3–10. Stapling method utilizing hollow ultrasonic feed horn conforming metal wire to staple together prepreg.

*Primary Examiner*—Curtis Mayes
*Attorney, Agent, or Firm*—Andrew C. Hess; David L. Narciso

[57] ABSTRACT

A plurality of layers of nonfully cured composite material are joined by a unique combination of steps including debulking and precuring the layers using vacuum followed by pressure and heating. Then spaced apart holes through the layers are generated with a pointed tool using ultrasonic energy which at least softens and smooths the hole wall. The layers are stitched through the holes prior to final curing.

1 Claim, 1 Drawing Sheet

METHOD FOR JOINING COMPOSITE MATERIALS

This application is a Continuation of application Ser. No. 08/092,375, filed Jul. 15, 1993, now abandoned, which is a continuation of Ser. No. 07/944,580, filed Sep. 19, 1992, now abandoned.

This invention relates to the making of fiber reinforced composite polymeric materials, and, more particularly, to a unique combination of method steps for joining a plurality of layers of such materials into a stitched article.

BACKGROUND OF THE INVENTION

In the gas turbine engine art, it has been found that certain components exposed in operation to relatively lower temperatures are conveniently constructed from fiber reinforced composite polymeric matrix (PMC) materials. The art has described a variety of methods for superimposing or stacking a plurality of reinforced, shaped layers, in a selected orientation, and then pressing and curing the layers into an article preform. Articles made in this way have included gas turbine engine blades, vanes and struts located in the forward or cooler-operating section of such an engine. For example, U.S. Pat. No. 3,892,612—Carlson et al., issued Jul. 1, 1975, describes one composite airfoil member and various aspects of making such a member. The disclosure of such patent is hereby incorporated herein by reference.

One evolution of such technology involved the development of composite airfoils, such as turbine engine fan blades and vanes, constructed of thin layers of fiber reinforced polymeric matrix material. For example, such fibers as carbon, graphite, glass, aramid, boron coated tungsten, etc. were impregnated with such polymeric materials. The layers were heat and pressure bonded together into an appropriate shape as an airfoil member.

During use of such a composite member, loads are transferred from one layer to the next by shear through joining material or interface. During an impact situation, as can occur from foreign, air-borne particles striking the airfoil, loads can bend the composite structure and generate large interlaminar shear forces which transfer loads from one fiber plane to the next. Since such composite structures are weaker in the "Z" axis direction (substantially normal to the lamination planes or zones), delamination can initiate.

It has been found that stitching together such composite structures in the "Z" direction can increase the structure's interlaminar properties. However, penetrating a needle carrying a thread or fiber-like member through such relatively thick, uncured materials can be difficult. It has been found that during such "Z" axis stitching using a needle, even driven using ultrasonic energy, the needle can act as a damper of such energy, and can weaken and break the notch sensitive "Z" axis stitching fiber while the needle and fiber are attempted to be driven through the laminated, uncured composite material.

SUMMARY OF THE INVENTION

The present invention, in one form, provides a method for joining a plurality of layers of nonfully cured composite material, including layers comprising a fiber reinforced polymeric matrix. The layers are superimposed generally in a preselected orientation, to define a prepreg shape. The method involves the combination of steps of vacuum and then heat and pressure debulking the prepreg shape to remove entrapped gas, to precure the matrix and to inhibit relaxation of the composite material during subsequent processing. After debulking into a preliminary preform, a plurality of spaced apart holes are generated through the superimposed layers by penetrating a thin, pointed tool into and through the preform using ultrasonic energy applied to the tool. Damping of the ultrasonic energy at the interface between the tool and the matrix being penetrated generates heat locally adjacent the tool to at least soften the matrix along a hole wall. Upon cooling, the hole wall is smooth and fiber reinforcement substantially is undisturbed away from the hole wall. In this way, holes are generated in a manner which facilitates tool penetration through the matrix and minimizes the effect on the fiber reinforcement in the matrix.

After the holes are generated, fiber-like member or material is placed through the holes to stitch together the layers of the composite material preform. Then the debulked and stitched preform is cured to provide a stitched, reinforced article.

In one form of the invention, the debulking of the prepreg shape includes placing the shape in a vacuum bag which is evacuated to create a vacuum. Then the bag is placed in a chamber which is filled with a pressurizing gas and heated to below the curing temperature range of the polymeric matrix to provide the preliminary preform for subsequent hole generation.

DESCRIPTION OF THE PREFERRED EMBODIMENTS

Figure 1:
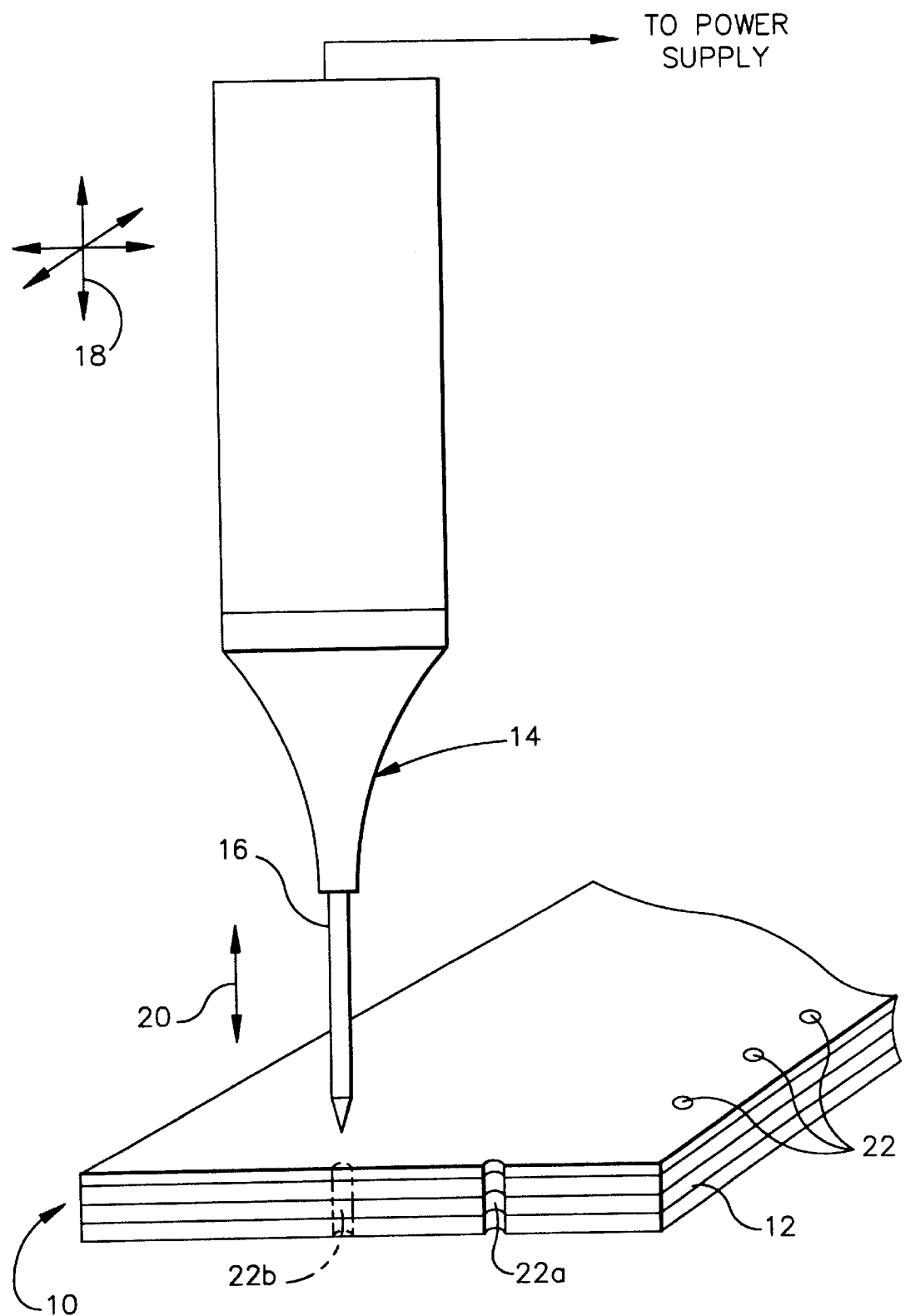
FIG. 1, is a partially sectional perspective view of superimposed layers of a debulked composite material during hole generation.

It is well known that ordinary thread carrying sewing machines have been used to stitch together superimposed layers of material such as cloth, paper, leather, plastic, etc. typical of such art is that shown in U.S. Pat. No. 4,541,349—Inoue, patented Sep. 17, 1985. In this patent, high frequency oscillations are applied to a needle carrying a thread. The penetration of the needle and thread is enhanced through application of amplified sonic or ultrasonic oscillatory signals transmitted to the needle.

Ultrasonic energy has been applied to already stitched synthetic material about the stitches to soften the synthetic material and flow it about the thread for reinforcement, as shown in U.S. Pat. No. 3,296,990—Simjian, patented Jan. 10, 1967. Also, ultrasonic energy has been used to melt and seal together, or weld, superimposed layers of thermoplastic material, as shown in U.S. Pat. No. 3,817,802 Meyer, patented Jun. 18, 1974.

The disclosures of each of the above identified patents are hereby incorporated herein by reference.

During evaluation of the present invention, it was found that using a threaded stitching needle with which ultrasonic energy was applied, as it penetrated superimposed layers of fiber reinforced, nonfully cured polymeric materials, resulted in breakage of the fiber used as a stitching material. It is believed that engaging the "Z" axis stitching fiber through a needle may act as a damper of the ultrasonic energy. In addition, it may weaken the notch sensitive "Z" axis stitching fiber while driving the needle and fiber through the material.

The method of the present invention includes a combination of steps which avoids such a problem and facilitates stitching of superimposed layers of fiber reinforced polymeric materials. Also it maintains the structural and mechanical property integrity of the article being produced.

A first of this combination of steps is debulking of a superimposed plurality of layers of such material to enhance near-net-shape production and to inhibit relaxation of the shape being processed. Debulking includes first exposing the stacked layers to a vacuum to remove entrapped gases from the spaces and interstices in the stack, and then pressing and heating the stack into a preliminary preform.

After debulking, the next step in the combination is the generation of a plurality of spaced apart holes selectively into and through the preliminary preform, typically in the "Z" axis direction. This is accomplished using a thin, pointed tool, such as a needle, which is not threaded and with which is used ultrasonic energy at a rate or level of energy which will cause the polymeric matrix to melt as a result of heat generated from damping of the ultrasonic energy locally in the matrix adjacent the tool. Upon withdrawal of the tool from the hole thus created, the matrix cools at the hole wall and the hole wall is provided with a smooth surface without disturbing the fiber reinforcement or matrix away from the hole wall.

A third step in the combination is stitching together the layers of the composite material through the holes created independently. This provides a debulked and stitched article preform ready for curing in the curing temperature range of the polymeric matrix material.

In specific examples of the method of the present invention, prepreg tape having an epoxy matrix reinforced with unidirectionally disposed graphite fibers were stacked in arrays of plies in the range of between about 75 and 200 plies. Each ply was about 0.005–0.011 inch in thickness and shaped in a preselected configuration according to the article being made. For example, in some evaluations, an airfoil shape was selected.

In order to debulk the prepreg stacked shape, it was first placed in a vacuum bag in which a vacuum in the range of greater than 20" of Hg, for example 25–30" Hg, was produced to remove air and other entrapped gases. The bagged shape was then placed in a closed chamber such as an autoclave in which an inert or nonreactive gas, for example nitrogen, argon, helium, carbon dioxide, etc., was exchanged. Gas pressure was generated in the autoclave and as the pressure increased, for example to about 20 pounds per square inch (psi), the vacuum in the bag was reduced, through an externally disposed valve, to an amount sufficient to draw off any gases generated in the processing. For example, about 5–8" Hg is typical. Pressure in the autoclave was increased to at least about 75 psi, preferably 75–125 psi, and nominally about 100 psi. Also the autoclave was heated to a temperature in the range of about 100–200° F., typically 125° F., to precure the matrix material, here epoxy resin, of the pressurized stack and to avoid relaxation of the shape after pressure removal and during subsequent processing. For example, without the combination of entrapped gas removal and pressurization while heating, such a stack could relax as much as about 10% of its volume. According to the present invention, this debulking combination reduces such relaxation to no more than about 2% of its volume and facilitates approaching a near-net-shape configuration. Heating under pressure in the autoclave is accomplished generally in about an hour after which the preliminary preform thus produced is removed from the autoclave.

After debulking, the preform is ready for the generation of holes for subsequent receipt of a stitching material. The holes were designed to be spaced apart about the preform, penetrating the superimposed layers generally normal to stacked layers, for example generally in the "Z" axis direction. According to the present invention, the holes were generated with a thin, pointed tool such as of steel, Ti, etc., for example a needle having a diameter in the range of about 0.03–0.07". However, in order to avoid disturbing the graphite reinforcement in the plies and the integrity of the preform, ultrasonic energy at about 20,000 cycles per second (cps) was applied to the needle. This level of ultrasonic energy is a function of the size of the ultrasonic power supply used. The object of using ultrasonic energy is to enable formation of a flowed or "recast" type surface on the hole wall as a result of damping of the ultrasonic energy from the rapidly oscillating, penetrating needle to the matrix at the hole wall. This damping of ultrasonic energy is displayed physically as friction. Such damping generates heat sufficient to at least soften the matrix material locally adjacent the needle tool. Therefore, the level of ultrasonic energy applied and the movement of the needle as a result of such energy application is a function of the apparatus used so long as the level is adequate to perform the penetration and matrix heating described above. After cooling, the hole wall was provided with a smooth surface with substantially no effect on the reinforcing fibers or the integrity of the stacked layers.

A typical arrangement for generating holes in the debulked stack is shown in the partially sectional perspective view of the drawing, FIG. 1. The debulked stack preliminary preform is shown generally at 10, comprising a debulked plurality of fiber reinforced polymeric matrix layers or plies 12. Commercially available ultrasonic feedhorn apparatus, shown generally at 14, is adapted to carry a thin, pointed tool or needle 16. The apparatus 14 can be moved three dimensionally, as desired for positioning, over preform 10 by hand or by conventional mechanical movement means well known in the art and represented by arrows 18. As a result of the concentration of ultrasonic energy to tool or needle 16 through feedhorn 14, the needle will vibrate in the directions shown by arrows 20. For example, using 20000 cps of ultrasonic energy, the needle can be adjusted to move in an amplitude between about 0.004–0.050 inch, and preferably 0.004–0.010 inch. This facilitates penetration of the needle into and through preform 10, generally in the "Z" axis direction shown, and the generation of heat at the interface between the needle 16 and the hole wall of holes 22 being produced. One such hole wall is shown at 22a in cross section. In the drawing, needle 16 is positioned to initiate producing a hole 22b shown in phantom. As has been stated, such holes can be produced in preform 10 in any desired configuration to facilitate subsequent stitching.

After generation of the holes, as described above, the preliminary preform was stitched through the holes using a stitching fiber such as a polymeric or glass bundle of flexible fibers. In this example, a bundle of Kevlar material fiber yarn was hand stitched through the holes in one embodiment and fiberglass thread was hand stiched through the holes in another embodiment.

Although flexible fibers were used in this example, it should be understood that non-flexible cured "rod stock" pultruded from polymeric impregnated fibers, such as from glass, carbon or aramid fibers, may be inserted as reinforcing "pins" through the holes or apertures in the laminate. In this arrangement, the diameter of the "rod stock" used as "pins" is about the same as the diameter of the holes or apertures. The use of the "rod stock" or pins eliminates the conventional "loops" on the laminate surface between the holes caused by the stitched fiber.

It should be understood that mechanical stitching means can be used, depending on the complexity of the hole array and the ability of mechanical sewing means to stitch directly into the holes of the array.

After stitching, the stitched article preform was cured, in the normal manner, in the curing temperature range of the matrix material.

In the embodiment utilizing "pins" or "rod stock" the article preform is again cured, in the normal manner, in the curing temperature of the matrix material, as described above. As the matrix material softens in this curing cycle, a bond is formed between it and the pin at the hole wall/pin interface which serves to anchor each pin into position in the hole wall or aperture.

Although the present invention has been described in connection with specific examples and embodiments, those skilled in the arts involved with readily recognize the variations and modifications of which this invention is capable. All such forms of the invention are intended to be included within the scope of the appended claims.

What is claimed is:

1. A method for joining a plurality of layers of non-fully cured composite material, including layers comprising a polymeric matrix having a curing temperature range and having a plurality of reinforcing fibers disposed therein, the layers being superimposed to define a single airfoil shape, the method comprising the steps of:

debulking the airfoil shape by first providing a vacuum about the shape to remove entrapped gas from and between the layers and then pressurizing and heating the shape to precure the polymeric matrix and to inhibit relaxation of the composite material during subsequent processing, thereby to provide a preliminary, debulked, precured, airfoil preform having a near net shape configuration of a final article;

generating a plurality of spaced apart holes, each defined by a hole wall, through the superimposed layers of the preliminary airfoil preform by penetrating a thin pointed tool into and through the preform using ultrasonic energy applied into the tool such that motion of the tool is limited to vibration in a direction substantially normal to the surface of the preform, the ultrasonic energy being applied at a rate which causes the polymeric matrix to at least soften as a result of heat generated from damping of the ultrasonic energy locally in the polymeric matrix adjacent the tool, whereby upon withdrawal of the tool from the hole and cooling of the polymeric matrix at the hole wall, the hole wall is provided with a smooth surface, and whereby the reinforcing fibers and the integrity of the superimposed layers are substantially unaffected;

fastening together the layers of the composite material through the holes, using fiber members, to provide a debulked airfoil preform, and then curing the airfoil preform in the curing temperature range to provide a cured, reinforced airfoil, the fiber members being bonded to the airfoil at the hole walls.

* * * * *